C. A. FEY.
COIN OPERATED WEIGHING SCALE.
APPLICATION FILED SEPT. 26, 1912.
1,077,517.
Patented Nov. 4, 1913.
3 SHEETS—SHEET 1.
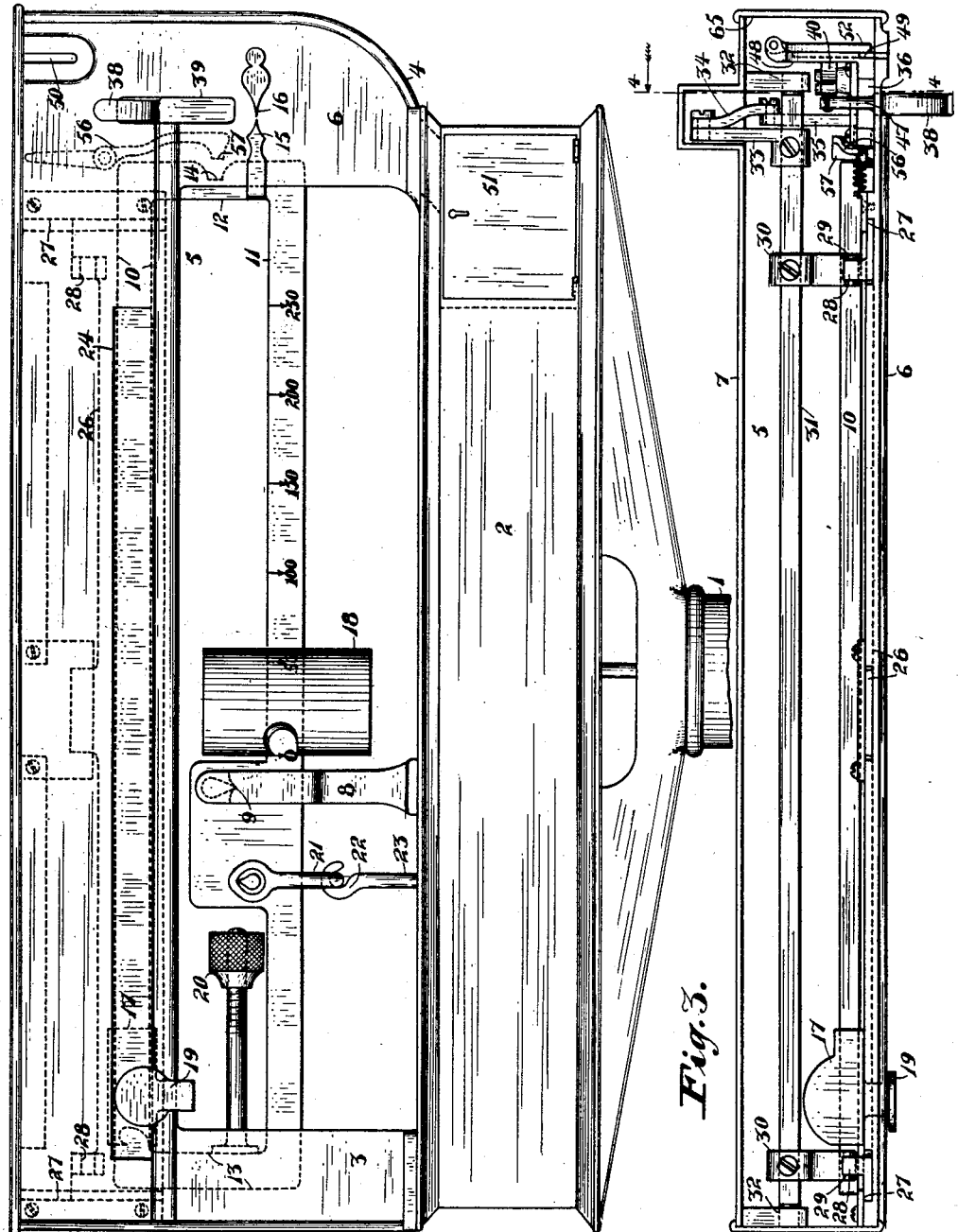

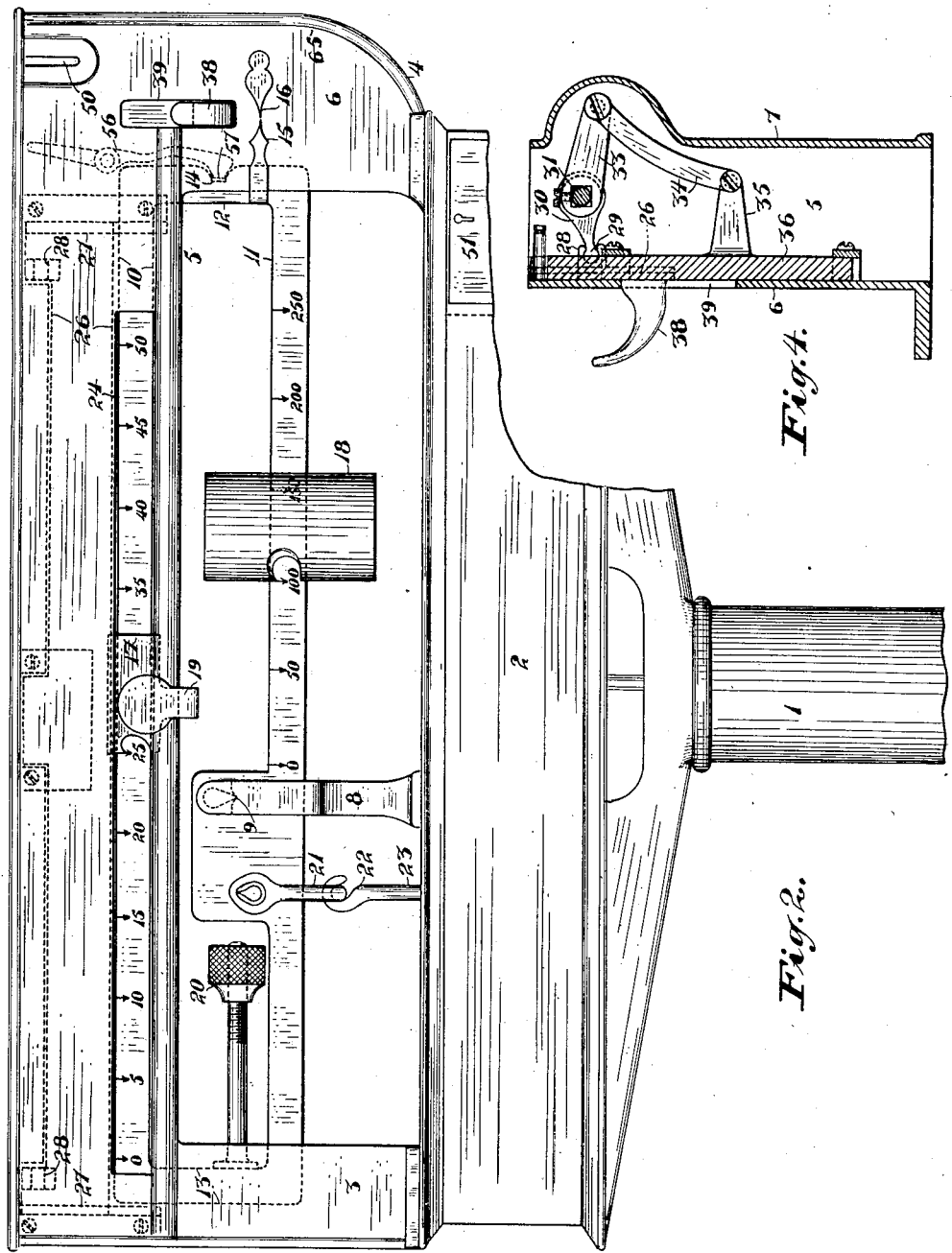

C. A. FEY.
COIN OPERATED WEIGHING SCALE.
APPLICATION FILED SEPT. 26, 1912.

1,077,517.

Patented Nov. 4, 1913.

3 SHEETS—SHEET 3.

WITNESSES
F. C. Fliedner
Harry H. Totten

INVENTOR
Charles A. Fey.
BY
N. A. Acker.
his ATTORNEY

COLUMBIA PLANOGRAPH CO., WASHINGTON, D. C.

UNITED STATES PATENT OFFICE.

CHARLES AUGUST FEY, OF FOND DU LAC, WISCONSIN.

COIN-OPERATED WEIGHING-SCALE.

1,077,517.   Specification of Letters Patent.   Patented Nov. 4, 1913.

Application filed September 26, 1912. Serial No. 722,459.

*To all whom it may concern:*

Be it known that I, CHARLES AUGUST FEY, a subject of the Emperor of Germany, residing at Fond du Lac, in the county of Fond du Lac and State of Wisconsin, have invented certain new and useful Improvements in Coin-Operated Weighing-Scales, of which the following is a specification.

The hereinafter described invention relates to an improved coin operated weighing-scale, particularly adapted to be employed in public places where free scales are now in use, whereby a source of revenue is derived from the users of the scale, and the invention has for its principal object to provide a coin-operated scale of the beam type in which the weights carried by the beam are capable of being adjusted to balance the beam to the weight of the user, and the weight indicated by the position of the weights relative to the beam is locked from the view of the user until a coin or token is deposited in the apparatus.

Another and important object is to provide a scale of the above type with means for locking the beam in its balanced position upon the exposing to the user of the position of the balance weights relative to the beam, that more than one weight cannot be ascertained upon the deposit of but a single coin or token.

The invention consists in a scale beam provided with the usual balancing weights, a housing in which one or both of the scale beam arms are inclosed, means exterior of the housing for adjusting the balancing weights relative to their arms to balance the beam, coin controlled means for exposing the beam arms to view, and means for locking the scale beam in its balanced position upon the exposing the beam arms to view.

With the above mentioned and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the appended claims, may be resorted to without departing from the spirit or sacrificing any advantages of the invention.

To more fully comprehend the invention, reference should be had to the accompanying drawings disclosing one form of my invention, wherein—

Figure 5:
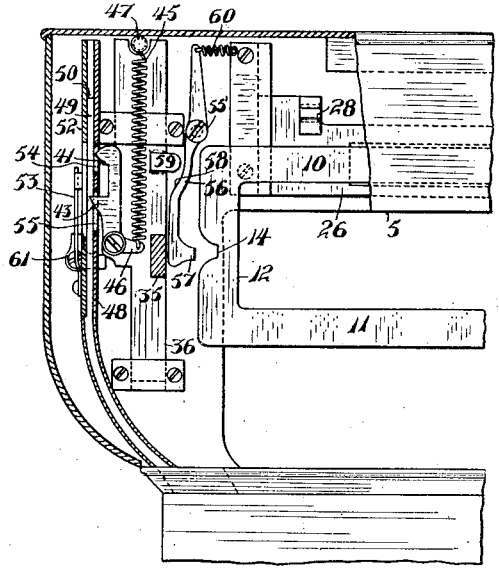
Figure 6:
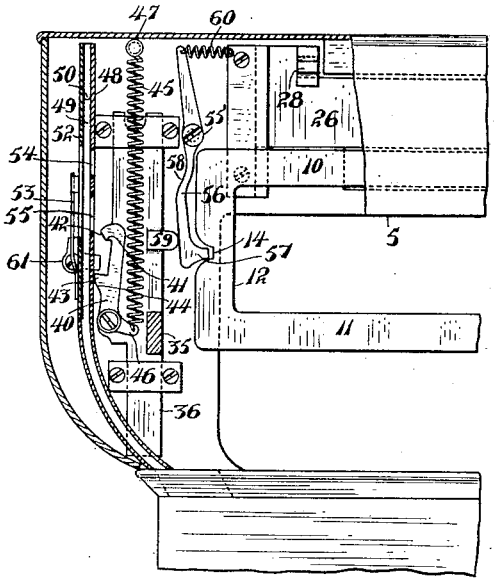
Figure 7:
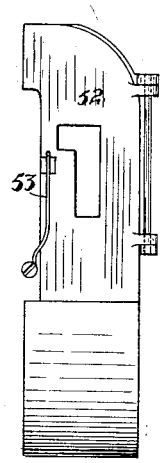
Figure 8:
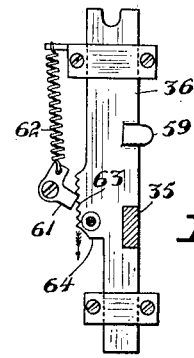

Figure 1 is a view in elevation of my invention mounted on the head portion of an ordinary type of beam weighing-scale, and disclosing the beam housing and the shield covering the upper beam arm in its lowermost position. Fig. 2 is a view similar to Fig. 1 but with the slide covering the upper beam arm in its raised position, disclosing the position of the weight carried thereby and the scale beam locked in its balanced position. Fig. 3 is a top plan view with the housing cover removed, disclosing the manner of mounting the shield and the actuating mechanism for the same. Fig. 4 is a sectional view taken on line 4—4 of Fig. 3 looking in the direction of the arrow. Fig. 5 is a rear elevation partly in section of the operating mechanism and the coin controlled locking pawl, the respective parts being disclosed in their normal position when the shield is in its lowermost position. Fig. 6 is a view similar to Fig. 5, disclosing the operating mechanism in the position when the shield is in its raised position and the scale beam is locked in its balanced position. Fig. 7 is a detail view of the hinged side for the coin slot and the manner of retaining the same in position. Fig. 8 is a detail view of the operating slide, disclosing the notches at one edge thereof and the spring pawl associated therewith for preventing the slide from being operated in the opposite direction to which it is traveling until it has completed its full length of travel.

The general construction of the weighing scale illustrated for disclosing my improved invention is the ordinary type of platform-scale, so that it is not necessary to disclose in the drawings the platform and its contained mechanism, as the features of my invention are all associated with the beam portion of the scale.

Referring more particularly to the drawings, the reference numeral 1 indicates a hollow standard rising from the scale platform (not shown) and on which is supported the head 2, providing a base on which rests the vertical end members 3 and 4 of a suitable hollow housing 5 formed of front and rear walls 6 and 7 which are secured together in spaced relation to each other in any suitable manner.

Extending vertically from the head 2 is a suitable fulcrum post 8, which pivotally supports, as at 9, the scale-beam, formed with the upper and lower bars 10 and 11 which are joined at their front ends by a bar 12 and at their rear ends by a bar 13; the bar 12 is provided in its outer edge with a suitable recess 14 and is also provided with a pointer 15, adapted when the beam is balanced to aline with a stationary indicator hand 16 carried by vertical end member 3 of the housing 5.

The fulcrum post 8 is of such height that the upper bar 10 of the scale beam is located within the housing 5 and on said bars 10 and 11 are slidably mounted the respective weights 17 and 18, the weight 17 being located within the housing 5, the same normally concealing it from view and is provided with an operating handle 19 which extends exteriorly of said housing.

The scale-beam carries the usual poise-adjusting weights 20, and between the weights and the pivoted point 9 of the scale-beam is connected, as usual, by the link 21 to a hook 22 formed at the upper end of a rod 23 through the medium of which connection is made with the scale-platform.

Formed in the front wall 6 of the housing 5 in front of the bar 10 is a horizontally extending opening 24 which is normally closed by a shield 26, slidably mounted in guides 27, formed in the inner surface of the wall 6, said shield being provided at its rear with suitable sockets 28 into which extend the rounded ends 29 of arms 30, which are mounted at their inner ends on a suitable shaft 31 extending longitudinally within the housing, and said shaft is journaled at its ends in suitable bearings 32, arranged adjacent each end of said housing.

Extending from the shaft 31 and positioned adjacent one end thereof is an arm 33 which is pivotally connected at its end by a link 34, with an arm 35 projecting rearwardly from an operating plate 36 slidably mounted in a suitable guideway formed in the inner face of the front wall 6.

An operating handle 38 projects from the opposite side of the plate 36 from the arm 35, and operates through a slot 39 in the front wall 6. It will be observed that upon grasping the handle 38 and sliding the operating plate 36 downwardly that the shield 26 will be moved upwardly uncovering the opening 24, and exposing the upper bar 10 of the scale-beam.

The coin-controlled mechanism is constructed in the following manner: Pivotally mounted on the plate 36 adjacent the arm 35 is a pawl 40, formed at its upper end with an outwardly projecting catch 41 having an upwardly beveled upper surface and provided on its underside with an inward and downwardly beveled surface 42, and said pawl is provided below said catch 41 with an outwardly projecting finger 43, the outer end of which extends beyond the end of the catch 41, and is inwardly and downwardly beveled on its under side, as at 44, the pawl being normally forced outwardly by the action of a coiled spring 45 which connects at its lower end with a lug 46, extending outwardly from the pawl adjacent its pivotal point, and said spring is secured at its upper end to a lug 47 projecting rearwardly from the front wall 6, the spring also drawing the plate 36 upwardly upon the release of pressure upon the operating handle 38, and the plate is limited in its upward movement by the lug 47. A plate 48 is arranged in coöperative relation to the pawl 40 and extends at right angles from the inner side of the front wall 6, and is secured thereto in any suitable manner.

A coin groove 49 is formed in the outer face of the plate 48, and the same communicates at its upper end with a receiving opening 50 formed in the front wall 6 of the housing, and at its lower end with a coin receiving box 51 secured to the head 2 in any suitable manner. A plate 52 covers the exposed side of the coin groove 49, and the same is hinged to one edge of the plate 48, and is retained in position against the outwardly extending edges of the groove 49 by a suitable tension spring 53.

The catch 41 and finger 43 formed on the pawl 40 are adapted to coöperate respectively with suitably arranged openings 54 and 55, provided in the plate 48, said openings being formed with upwardly and inwardly beveled top edges and downwardly and inwardly beveled bottom edges, and the finger 43 when in normal position projects through the opening 55 into the coin groove 49. From the above construction it will be observed that when a coin is inserted in the groove 49 the same will rest on the finger 43, and as the plate 36 is moved downwardly the action of the spring 45 will have a tendency to force the catch 41 into the opening 54, but the same will be prevented from projecting entirely through said opening by the end of the catch contacting with the face of the coin, and upon further downward movement of the plate the beveled surface 42 of the pawl will contact with the beveled bottom edge of the opening 54, which will move the pawl inwardly and the catch will slide down the inner face of the plate 48. As the catch 41 contacts with the inner face of the plate 48 the finger 43 will also be withdrawn from under the coin, and the same will drop through the groove 49 into the coin receptacle 51.

During the above operation the shield 26 will be moved upwardly uncovering the opening 24 and exposing the bar 10. Should the plate 36 be moved downwardly without the insertion of a coin within the coin groove 49, the action of the coiled spring 45 will force the catch 41 into the opening 54, and there being nothing to prevent the catch 41 from projecting entirely through the opening 54, the beveled surface 42 of the catch 41 will not contact with the beveled bottom edge of the opening 54, and consequently the straight lower surface of the catch will engage the outer edge of the opening 54 and prevent the plate 36 from being forced downwardly.

The means for locking the scale beam in its balanced position upon the operating of the shield 26 to uncover the opening 24 consists of the following mechanism:—Pivotally mounted to a stud 55, secured to the inner face of the front wall 6 of the housing, and positioned adjacent the plate 36 is a lever 56, formed on its lower end with a lug 57, which is adapted to be seated in the recess 14, in the bar 12, and said lever is provided on the edge opposite to the lug 57 with a suitable cam surface 58, which is adapted to be engaged on the downward movement of the plate 36 by a lug 59 carried by the plate 36, and the action of the lug 59 on the cam surface 58 will force the lug 57 into the recess 14 and lock the scale beam in its balanced position. A coiled spring 60 is connected to the upper end of the lever 56, and to the inner face of the front wall 6 and the action of said spring is to withdraw the lug 57 from the recess 14 when the lug 59 is disengaged from the cam surface 58.

A pawl 61 is pivotally mounted on a suitable stud extending from the inner face of the plate 6 and said pawl is maintained normally in a horizontal position by the action of a coiled spring 62. The pawl 61 is adapted to engage suitable ratchets 63 formed in the outer edge of a projection 64 on said plate 36 and from the above construction it will be observed that the plate 36 will be prevented from moving oppositely to the direction of its movement when engaged by said pawl, until the plate has completed its full travel in one direction or the other.

A suitable plate 65 is detachably secured to cover the end of the housing adjacent the coin controlled mechanism, that upon any derangement of the mechanism, the plate may be readily removed and easy access had to the deranged part.

The operator desiring to ascertain his weight, steps on the scale platform, adjusts the weights along their respective bars, until the beam balances, and the pointer 15 registers with the indicator hand 16. The beam is now balanced, but the operator cannot see the position of the weight 17 on the bar 10, as the same is within the housing and the shield 26 is positioned over the opening 24 formed in the front wall 6 directly in front of the bar 10. The operator to see the position of the weight 17 relative to the graduation on the bar 10, must insert a suitable coin or token in the opening 50, that the same may drop into the groove 49, and a coin inserted in the opening 50 will rest on the finger 43, and as the plate 36 is moved downwardly the catch 41 will contact with the coin or token and be prevented from projecting through the opening 54 in the plate 48. The beveled under surface of the catch 41 will slide from the beveled edge of the opening 50, the coin or token will drop from the finger 43 into the receptacle, and the pawl 40 will slide down the inner face of the plate 48, the downward movement of the plate 36 through its connections with the shield 26, will raise the same and expose the weight 17 on the bar 10, and simultaneously therewith the lug 57 will be forced in the recess 14 and lock the scale beam in its balanced position. The parts will remain in the above position until the operator releases the handle 38 at which time they will be restored to their normal position by the respective springs associated therewith. Upon the return or upward movement of the plate 36, the pawl 61 will engage the ratchets 63 on said plate and remain engaged with the same until the catch 41 and finger 43 project into their respective openings in the plate 48.

Having thus fully described my invention what is claimed as new and is desired to be protected by Letters Patent is—

1. In a weighing-scale, the combination with a scale-beam and a movable weight coöperating therewith, a shield normally covering said scale-beam and weight, mechanism for locking said shield in its normal position, means carried by said movable weight and extending exteriorly of said shield for adjusting said weight relative to said scale beam to balance said beam when the same is covered by said shield, and means for operating said shield to expose the position of said weight relative to said scale-beam when the beam is in its balanced position.

2. In a weighing-scale, the combination with a scale-beam and a movable weight coöperating therewith, a shield normally covering said scale-beam and weight, mechanism for locking said shield in its normal position, means carried by said movable weight and extending exteriorly of said shield for adjusting said weight relative to said scale beam to balance said beam when the same is covered by said shield, means for operating said shield to expose the position of said weight relative to said scale-beam when the beam is in its balanced position, and means for locking said scale-beam in inoperative position upon the operating of said shield to expose said beam to view.

3. In a weighing-scale, the combination with a scale-beam and a movable weight coöperating therewith, a shield normally covering said scale beam and weight, mechanism for locking said shield in its normal position, means extending from said weight and projecting exteriorly of said shield for adjusting said weight relative to said scale-beam to balance said beam when the same is covered by said shield, means for operating said shield to expose the position of said weight relative to said scale-beam, and means controllable by said shield operating means for locking said scale-beam in its balanced position upon the exposing of the same to view.

4. In a weighing-scale, the combination with a scale-beam and a movable weight coöperating therewith, a housing inclosing said beam, said housing being provided with an opening through which said beam is exposed, a shield normally closing said opening, means extending from said weight and projecting exteriorly of said housing for adjusting said weight relative to said scale-beam to balance said beam when the same is concealed by said shield, and means for operating said shield to expose said beam when in its balanced position.

5. In a weighing-scale, the combination with a scale-beam and a movable weight coöperating therewith, a housing inclosing said beam, said housing being provided with an opening through which said beam is exposed, a shield normally closing said opening and concealing said beam, mechanism for locking said shield in its normal position, means extending from said weight and projecting exteriorly of said housing for adjusting said weight relative to said scale-beam to balance said beam when the same is concealed by said shield, a plunger for shifting said shield to expose said beam, and means for normally preventing movement of said plunger.

6. In a weighing-scale, the combination with a scale-beam and a movable weight coöperating therewith, a housing for inclosing said beam, said housing being provided with an opening through which said beam is exposed, a shield normally closing said opening and concealing said beam, mechanism for locking said shield in its normal position, means extending from said weight and projecting exteriorly of said housing for adjusting said weight relative to said scale-beam to balance said beam when the same is concealed by said shield, means for unlocking said shield and operating the same to expose said scale-beam, and means for locking said scale-beam in inoperative position upon the exposure of the same.

7. In a weighing-scale, the combination with a scale-beam and a movable weight coöperating therewith, a housing for inclosing said beam, said housing being provided with an opening through which said beam is exposed, a shield normally closing said opening and concealing said beam, mechanism for locking said shield in its normal position, means extending from said weight and projecting exteriorly of said housing for adjusting said weight relative to said scale-beam to balance said beam when the same is concealed by said shield, means for unlocking said shield and operating the same to expose said scale-beam, and means controllable by said shield operating means for locking said scale-beam in its balanced position upon the exposing of the same to view.

8. In a weighing-scale, the combination with a scale-beam formed with the usual upper and lower bars, movable weights coöperating with each of said bars, a housing for inclosing said upper-bar, said housing being provided with an opening through which said bar is exposed, a shield normally closing said opening and concealing said upper-bar, mechanism for locking said shield in its normal position, means extending from the weight coöperating with said upper-bar and projecting exteriorly of said housing for adjusting said weight relative to said upper-bar to balance the same when the same is concealed by said shield, and means for unlocking said shield and operating the same to expose said upper-bar.

9. In a weighing-scale, the combination with a scale-beam formed with the usual upper and lower bars, movable weights coöperating with each of said bars, a housing for inclosing said upper-bar, said housing being provided with an opening through which said bar is exposed, a shield normally closing said opening and concealing said upper-bar, mechanism for locking said shield in its normal position, means extending from the weight coöperating with said upper-bar and projecting exteriorly of said housing for adjusting said weight relative to said upper-bar to balance the same when the same is concealed by said shield, means for unlocking said shield and operating the same to expose said upper-bar, and means for locking said scale-beam in inoperative position upon the exposing of said upper-bar.

10. In a weighing-scale, the combination with a scale-beam formed with the usual upper and lower bars, movable weights coöperating with each of said bars, a housing for inclosing said upper-bar, said housing being provided with an opening through which said bar is exposed, a shield normally closing said opening and concealing said upper-bar, mechanism for locking said shield in its normal position, means extending from the weight coöperating with said upper-bar and projecting exteriorly of said housing for adjusting said weight relative to said upper-bar to balance the same when the same is concealed by said shield, means for unlocking said shield and operating the same to expose said upper-bar, and means controllable by said coin controlled shield operating means for locking said scale beam in its balanced position upon the exposing of said upper-bar.

11. In a scale, the combination with a scale beam and a movable weight coöperating therewith, of a shield normally positioned to cover said beam and weight, means for shifting said shield to expose the beam and weight, and means for simultaneously locking said beam against movement on its fulcrum.

12. In a scale, the combination with a scale beam and a movable weight coöperating therewith, of a shield normally positioned to cover said beam and weight, a plunger operatively connected to said shield and adapted to shift the same to expose the beam when it is moved, a member adapted to engage said scale beam to hold the same against movement on its fulcrum, said plunger being provided with a portion adapted to engage said last mentioned member and move the same into engagement with the beam when the plunger is moved to shift the shield.

In testimony whereof I have signed my name to this specification in the presence of two subscribing witnesses.

CHARLES AUGUST FEY.

Witnesses:
GEO. A. DANA,
WILLIAM F. SCHMIDT.

---

Copies of this patent may be obtained for five cents each, by addressing the "Commissioner of Patents, Washington, D. C."